(12) United States Patent
Parthasarathy

(10) Patent No.: US 7,574,356 B2
(45) Date of Patent: Aug. 11, 2009

(54) SYSTEM AND METHOD FOR SPELLING RECOGNITION USING SPEECH AND NON-SPEECH INPUT

(75) Inventor: Sarangarajan Parthasarathy, New Providence, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 767 days.

(21) Appl. No.: 10/894,201

(22) Filed: Jul. 19, 2004

(65) Prior Publication Data

US 2006/0015336 A1  Jan. 19, 2006

(51) Int. Cl.
*G10L 15/00* (2006.01)
(52) U.S. Cl. .................... 704/231; 704/240; 704/252; 704/235; 704/270; 379/88.01; 379/77
(58) Field of Classification Search ................ 704/231, 704/235, 251, 240, 252, 253–255, 270, 275; 379/88.01–88.03, 67, 77, 89
See application file for complete search history.

(56) References Cited

U.S. PATENT DOCUMENTS

| | | | | |
|---|---|---|---|---|
| 4,829,580 A | * | 5/1989 | Church | 704/260 |
| 5,454,063 A | * | 9/1995 | Rossides | 704/275 |
| 5,638,425 A | * | 6/1997 | Meador et al. | 379/88.01 |
| 5,640,488 A | * | 6/1997 | Junqua et al. | 704/245 |
| 5,677,990 A | * | 10/1997 | Junqua | 704/255 |
| 5,917,889 A | * | 6/1999 | Brotman et al. | 379/88.01 |
| 5,937,380 A | * | 8/1999 | Segan | 704/235 |
| 5,991,720 A | * | 11/1999 | Galler et al. | 704/256.5 |
| 6,012,030 A | * | 1/2000 | French-St. George et al. | 704/275 |
| 6,137,863 A | * | 10/2000 | Brown et al. | 379/88.01 |
| 6,141,661 A | * | 10/2000 | Brown et al. | 707/104.1 |
| 6,182,039 B1 | * | 1/2001 | Rigazio et al. | 704/257 |

(Continued)

FOREIGN PATENT DOCUMENTS

EP  0 961 263 A2  12/1999

(Continued)

OTHER PUBLICATIONS

Grace Chung, Stepahnie Seneff. "Integrated Speech with Keypad Input for Automatic Entry of Spelling and Pronunciation of New Words", 7th International Conference on Spoken Language Processing, Sep. 16-20, 2002, Denver Colorado, pp. 2061-2064.

(Continued)

*Primary Examiner*—Vijay B Chawan

(57) ABSTRACT

A system and method for non-speech input or keypad-aided word and spelling recognition is disclosed. The method comprises performing spelling recognition via automatic speech recognition (ASR) on received speech from a user, the ASR being performed using a statistical letter model trained on domain data and producing a letter lattice $R_{LN}$. If an ASR confidence is below a predetermined level, then the method comprises receiving non-speech input from the user, generating a keypad constraint grammar K and generating a letter string based on a composition of finite state transducers $R_{LN}$ and K. Other variations of the invention include recognizing input by first receiving non-speech input, dynamically generating an unweighted grammar, generating a weighted grammar using domain data, and then performing speech, and thus spelling, recognition on input speech using the weighted grammar.

23 Claims, 2 Drawing Sheets

U.S. PATENT DOCUMENTS

| | | | |
|---|---|---|---|
| 6,400,805 B1 * | 6/2002 | Brown et al. | 379/88.01 |
| 6,728,348 B2 * | 4/2004 | Denenberg et al. | 379/93.18 |
| 6,895,257 B2 * | 5/2005 | Boman et al. | 455/556.1 |
| 2005/0283364 A1 * | 12/2005 | Longe et al. | 704/257 |

FOREIGN PATENT DOCUMENTS

| | | | |
|---|---|---|---|
| EP | 1 414 223 A | 4/2004 | |

OTHER PUBLICATIONS

Parthasarathy S.: "Experiments in keypad-aided spelling recognition", Acoustics, Speech, and Signal Processing, 2004. Proceedings, (ICASSP '04). IEEE International Conference on Montreal, Quebec, Canada May 17-21, 2004, Piscataway, NJ, USA, IEEE, vol. 1, May 17, 2004, pp. 873-876, XP010717768. ISBN:0-7803-8484-9 *paragraph [0002]*.

* cited by examiner

SYSTEM AND METHOD FOR SPELLING RECOGNITION USING SPEECH AND NON-SPEECH INPUT

BACKGROUND OF THE INVENTION

1. Field of the Invention

The present invention relates to recognition and more specifically to combining speech and non-speech input to improve spelling and speech recognition.

2. Introduction

Automatic speech recognition (ASR) systems that are being deployed today have the ability to handle a variety of user input. ASR systems are deployed, for example, in call-centers where a person may call in and communicate with the spoken dialog computer system using natural speech. A typical call-center transaction might begin with a fairly unconstrained natural language statement of the query followed by a system or user-initiated input of specific information such as account numbers, names, addresses, etc. A transaction is usually considered successful if each of the input items (fields) is correctly recognized via ASR, perhaps with repeated input or other forms of confirmation. This implies that each field has to be recognized very accurately for the overall transaction accuracy to be acceptable.

In order to achieve the desired accuracy, state-of-the-art ASR systems rely on a variety of domain constraints. For instance, the accuracy with which a 10-digit account number is recognized may be 90% using a digit-loop grammar but close to perfect when the grammar is constrained to produce an account number which is in an account-number database. Similarly, if one has access to a names directory and the user speaks a name in the directory, the performance of ASR systems is generally fairly good for reasonable size directories.

In some applications, the use of domain constraints is problematic. As an example, consider an application whose purpose is to enroll new users for a service. In this case, information such as the telephone number, name etc., need to be obtained without the aid of database constraints. One could still use priori constraints, such as a names directory that covers 90% of the US population according to the US Census data, to improve recognition accuracy. However, if the names distribution of the target population does not match the US Census distribution, the out-of-vocabulary (OOV) rate could be substantially higher than 10%.

Recognition of long digit-strings, names, spelling and the like over the telephone, whether human or machine, is inherently difficult. Humans recover from recognition errors through dialog. Such dialogs, which might involve a prompt to repeat a portion of the digit string or a particular letter in a name, have been implemented in ASR systems but with limited success. In the short-term, it appears that the best way to achieve very accurate recognition of difficult vocabularies such as letters and digits is to use to supplement voice with other input modalities such as keypads that produce touch-tones. The telephone keypad is designed for numeric entry and therefore is a natural backup modality for digit-string entry. However, the keypad is not as convenient for the entry of letter strings such as when names are spelled.

Cluster keyboards that partition the letters of the alphabet onto subset keys have been designed to facilitate accurate letter-string entry using keyboards. The letter ambiguity for each key-press in these keyboards is addressed by hypothesizing words in a dictionary that have the highest probability according to a language model. Such methods are effective, but they require the use of specialized keypads. If one is constrained to use the standard telephone keypad, one possibility is to use speech for disambiguation. A scheme for integrating keypad and speech input has been introduced recently but are not as successful as would be desired.

What is needed in the art is a system and method to obtain spelling recognition using information from keypad input and improved strategies for the combined use of the non-speech input such as telephone keypad input as well as voice for highly accurate recognition of spellings.

SUMMARY OF THE INVENTION

Accurate recognition of spellings is necessary in many call-center applications. Recognition of spellings over the telephone is inherently a difficult task and achieving very low error rates, using automatic speech recognition, is difficult. Augmenting speech input with input from the telephone keypad or other non-speech input source can reduce the error rate significantly. The present disclosure presents a number of inventions for combining the non-speech input and speech input. Experiments on a name entry task show that spellings can be recognized nearly perfectly using combined input, especially when a directory lookup is possible. The invention applies primarily to spelling scenarios but is also applicable in other, more standard speech recognition contexts.

The invention comprises systems, methods and computer-readable media that perform the steps of automatic speech recognition and include a component for keypad or non-speech input. An example embodiment relates to a method for recognizing a combination of speech followed by keypad or non-speech input. The invention will preferably apply to disambiguate received speech via additional non-speech input. The method comprises receiving speech followed by a keypad sequence from a user, dynamically constructing an unweighted grammar permitting all letter sequences that map to the received non-speech input, constructing a weighted grammar using the unweighted grammar and a statistical letter model (such as an N-gram letter model) trained on domain data, receiving speech from the user associated with the non-speech input and recognizing the received speech and non-speech input using the constructed weighted grammar.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
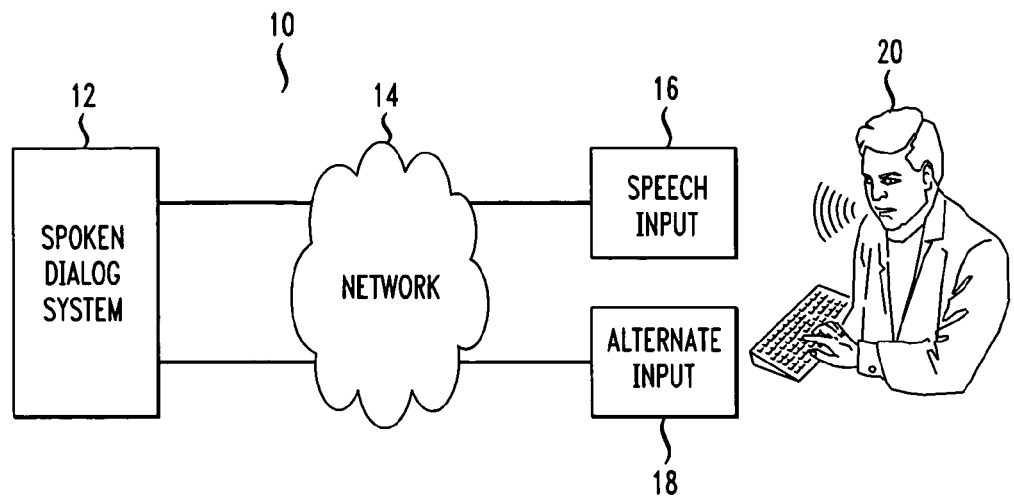
FIG. 1 illustrates a basic system according to an embodiment of the invention.

There are a number of ways to improve the performance of spelling recognition using the constraints provided by non-speech input or keypad input. FIG. 1 illustrates the basic architecture 10 of the present invention. The architecture includes a spoken dialog system 10 communicating via a network 10 with a user 20. The user has at least two means to communicate with the system 12. First, the user has a speech input means 16 to provide speech to the system 12. This may include such speech input means as a telephone, handheld computing device, cell phone, voice over IP communication, or any other means for providing a speech signal which may be transmitted to the system 12. Second, the user 20 has an alternate input means 18 which includes, by way of example, a keypad input, a touch-sensitive screen, a mouse-click and display, etc. The alternate input means may comprise any non-speech input mechanism that is physically attached to the speech input means 16. The alternate input means 18 may also be separate from the speech input means 16. The alternate input means 18 also communicates information over the network 14 to the spoken dialog system for processing along with the speech input to improve the recognition of the speech input.

As can be appreciated, this only provides a basic description of the architecture and any variety of communication architectures, both wired and wireless, may be employed to communicate the speech and alternate input to the system 12. For example, given the vehicle embodiment below, the network may comprise a network connecting speech and non-speech inputs and a computer in the vehicle that processes the input and provides responses.

Figure 2:
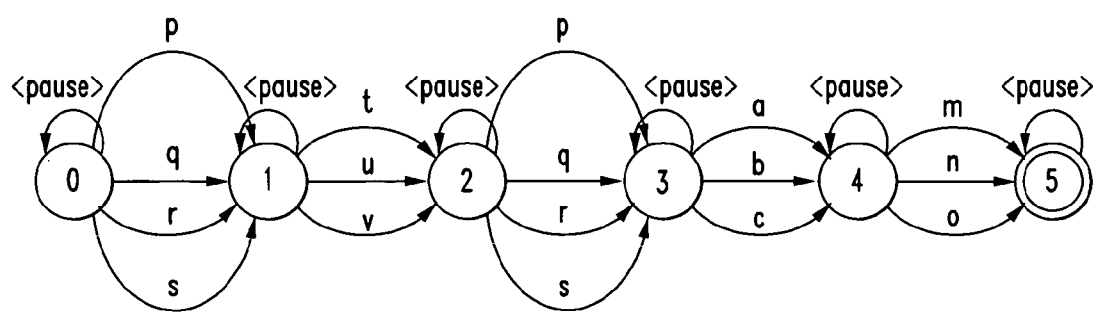
FIG. 2 illustrates an unweighted grammar generated from alternate input.
Figure 3:
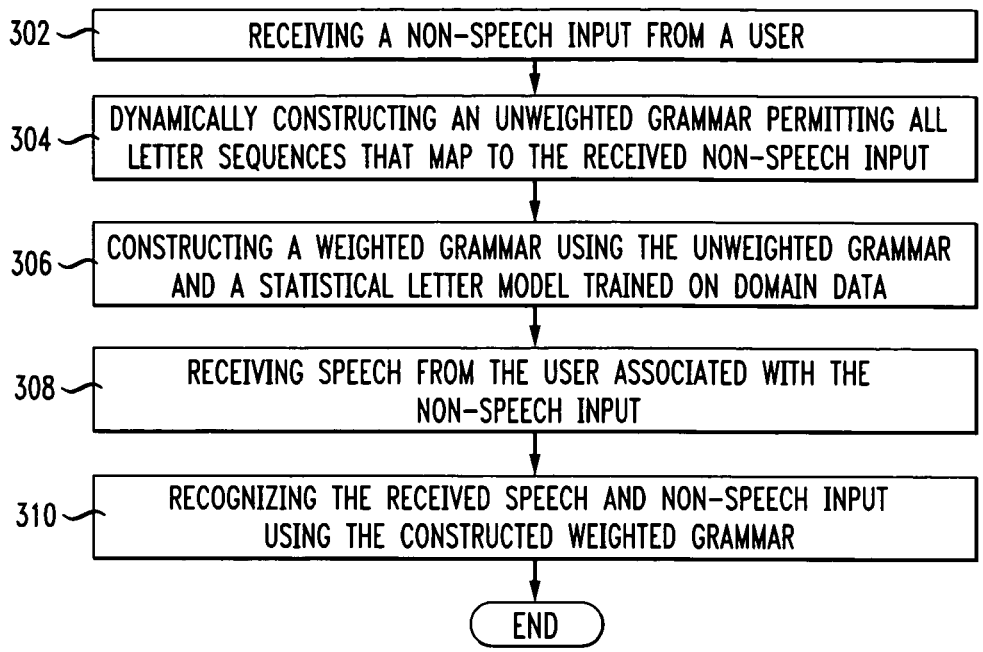
FIG. 3 illustrates a method embodiment of the invention.

In an example embodiment, the alternate input 18 is a telephone keypad. There are either 3 or 4 letters of the alphabet that are associated with each key on the telephone keypad. FIG. 3 illustrates a method aspect of this embodiment which comprises obtaining non-speech input (such as a keypad sequence) from a user (302) and dynamically constructing a grammar (304) that permits all letter sequences that map to the given non-speech input. An example grammar is shown in FIG. 2 for the name "susan". In this example, the grammar is unweighted. Continuing with the embodiment shown in FIG. 3, if one had access to spellings that characterize the domain, such as a directory of names for the name recognition task, one could use a statistical letter model such as, for example, an N-gram letter model $L_N$ trained on this data, and construct a weighted grammar (306).

$$K_w = K \cap L_N \quad (1)$$

where K is the unweighted keypad grammar, and $\cap$ is the intersection operation. Any suitable statistical letter model will be sufficient for the purposes of the present invention. The invention is described using an N-gram model.

If the corpus on which $L_N$ is estimated is large, an unsmoothed N-gram model (only those N-grams that appear in the training corpus are allowed) provides a significant advantage. Next, the system receives speech from the user associated with the non-speech input (308) and the system recognizes the received speech using the speech, received non-speech input and weighted grammar (310). As has been mentioned above, using the keypad sequence is one example of non-speech input and typically the speech input is received before the non-speech input.

Other contexts in which this invention may be employed are for providing alphanumeric account numbers. These are particularly difficult sounds to accurately recognize by a spoken dialog system. Other alphanumeric scenarios include where a person is in a vehicle and is interested in receiving directions or other information. ASR in a vehicle presents extra background noise that increases the difficulty of accurate recognition. The person may need to provide address information which comprises a combination of words and numbers. In a vehicle, the non-speech input may be provided via a touch-sensitive screen viewable by the driver or passenger. As an address is spoken, a database of addresses/street names/city names and other related information may be used to recognize words spoken. On the screen, a short list of possible recognition answers may be presented and the person may be able to provide input to identify the correct word or numbers. An example will illustrate the operation.

A challenge exists where the person begins to say or spell a street name and there is a large list of possibilities to present. The lattice-based approach of the present invention enables a dynamic approach of reducing and narrowing the list of possibilities as more speech information is received.

Suppose the driver desires directions on his navigation system in a vehicle to 5110 Spencer Street. When the spoken dialog system is in the position of receiving the address to look up, the person states "five one one zero . . . " When the word "five" is spoken, a large list of possible addresses beginning with "5" is on the possibilities list. As the other words are spoken, "one one" and so on, the lattice-based approach enables the constraints on the lattice to dynamically be applied to locate the most probable path through the lattice. On the display, as the snort list is generated, the numbers appear on the screen. Suppose that the confidence level in recognizing the number "zero" was low and there was some confidence in another number being recognized, say "three" due to background noise. The display could show the following:

5110
5113

The user could then provide either speech or non-speech input to disambiguate between the two numbers. The non-speech input may come in the form of touching the touch-sensitive screen, or using buttons on the steering wheel. In this regard, it is known that steering wheel buttons may be used for controlling speed and radio functions. These buttons may also be utilized when in this mode to navigate and control the screen to identify recognition input. For example, the scan/search radio button could be used to indicate up or down on the short list of recognition options to identify the correct option easily with the least distraction for the user.

If the user is using a T9 keypad (telephone keypad), then the lattice-based approach may be used to disambiguate spellings without the need to press the same key numerous times. For example, the letter "I" may be obtained by pressing the "4" key three times. However, when spelling, the user may be able to only hit each key once for one of the three or four letters associated with the key. The system according to the present invention can dynamically identify lists of possibilities by using lattices to disambiguate the possible spellings of words.

In another aspect of the example above, a user could start with a street name. If the noise in the vehicle prevents the recognition of the name "Spencer", the system may query the user for the first letter in the name of the street. The user can they say "S" or "S as in Sam" and the display can provide a short list of streets beginning with the letter "S". If the user begins by providing the street name, then a database of all numbered addresses on that street may be used to improve the recognition of the address. If the number 5113 was not a house number on Spencer street, the confidence score for the number 5110 would be raised.

The basic approach towards receiving speech and non-speech input according to the present invention has many applications in scenarios like the vehicle/address scenario where a combination of speech input and non-speech input in the forms of touching a touch sensitive screen or manipulating multi-function buttons can provide an efficient and safe exchange of information between the person and the spoken dialog system.

The accuracy of recognizing the spelling, words or names using state-of-the-art ASR systems is reasonably good, especially if good language models (of letter sequences) are available. One aspect of the invention provide for performing spelling recognition using ASR alone in the first pass, and use non-speech input only when the ASR confidence is low. This way, the inconvenience of using non-speech data entry will be limited to those utterances that are poorly recognized for reasons such as the presence of background noise or unusual accents. This approach is shown in FIG. 4.

Figure 4:
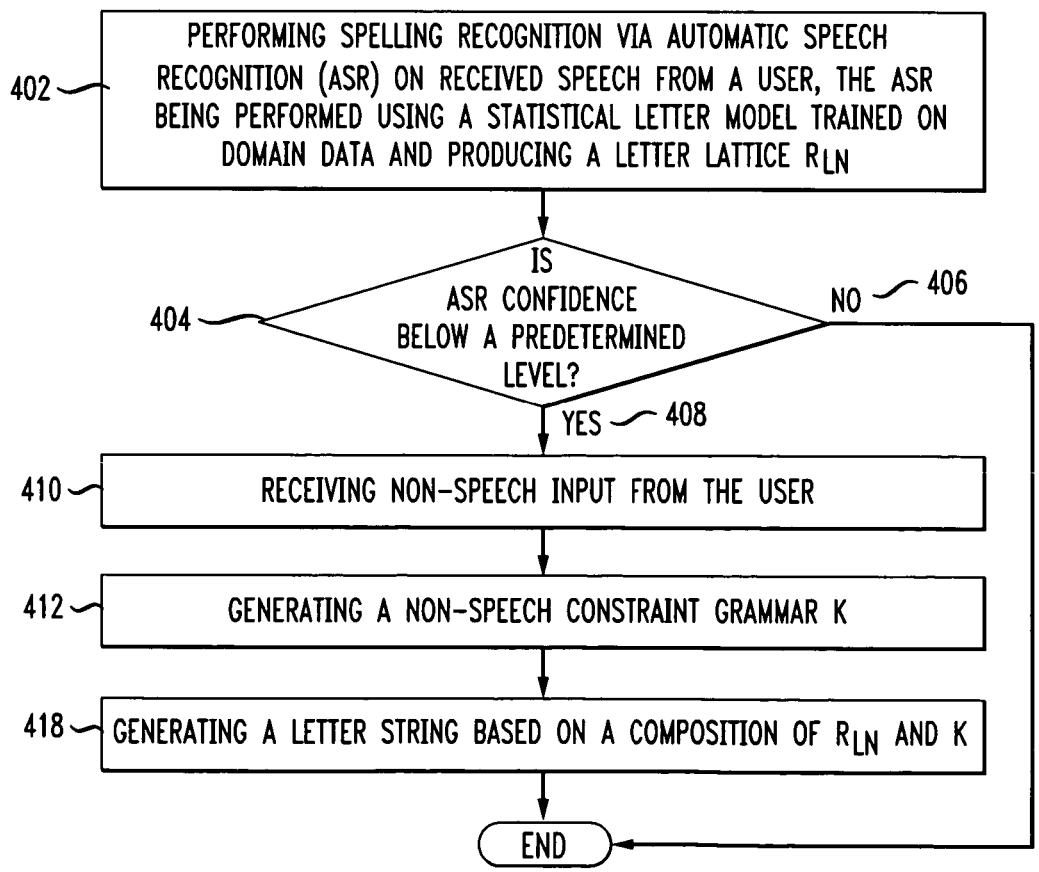
FIG. 4 illustrates another method embodiment of the invention.

As shown in FIG. 4, this embodiment of the invention provides a method comprising performing spelling recognition via ASR and received speech from the user, the ASR being performed using the statistical letter model $L_N$ (preferably an N-gram letter model) trained on domain data and producing a letter lattice $R_{L_N}$ (402). The system determines whether the ASR confidence level is below a predetermined level (404). If the ASR confidence level is not below the threshold (406), then the ASR process ends. If the ASR confidence level is below the threshold (408), then the user is then asked to input the letter string using non-speech means such as, for example, the keypad (system instructions: "1 press for each letter in the word" or "press the volume button on the steering wheel to navigate the list of street name") and the system receives the non-speech input (410) and generates a constraint grammar K (412). The final result is the letter string $$r = \text{bestpath}(R_{L_N} \circ I \circ K) \qquad (2)$$

where $\circ$ denotes the composition of finite-state transducers, and I is a transducer that eliminates silences and other filler words in the recognized output (418).

Each of the concepts described herein could be followed by a lookup in a database (of valid words, names, etc.) to find a valid letter sequence. The resulting letter string $$r_D = \text{bestpath}(R_{NC} \circ D) \qquad (3)$$

where $R_{NC}$ is the word lattice obtained by one of the processes described below without a database constraint and D is a finite state network that accepts only valid letter strings. Implementing database lookup as a separate step from speech recognition has the following advantages: (1) The complexity of the recognizer does not grow with the size of the database/directory; and (2) The vocabulary (allowed letter strings) as well as domain-dependent language models (such as frequency of requested names) could be updated independent of the recognizer, thereby simplifying service deployment.

Another option is the use of non-speech input to constrain only the first N letters. For long names or long street names, keying in all the letters may be too burdensome, but keying in only the first few may be considered acceptable. This provides a way to tradeoff accuracy for convenience, and combined with a database lookup is very effective.

One task mentioned above associated with the process of speech recognition is the recognition of spelled names. In applications where a directory is not available, a common solution is to attempt to cover as large a target population as possible, using a directory of names obtained from an independent source such as the Census or the Social Security Administration in the United States or a listing a street names from a city database. However, one cannot depend on the distribution of names in the target population matching the distribution of the general population of the country. Table 1 shows the out-of-vocabulary (OOV) rate of names taken from three tasks, an AT&T customer service task associated with open names, and two corporate directories containing about 50,000 unique names, for a range of vocabulary sizes.

The Census data indicates that 90,000 of the most frequent names cover about 90% of the U.S. population. Table 1 illustrates Out-of-vocabulary rates for test names taken from three tasks as a function of the size of a given directory. From Table 1, it is clear that the OOV rates can be significantly higher for a given task. The conclusion is that the vocabulary (grammar) of an ASR system designed to recognize names will need to be very large to keep OOV rates low. The performance of a state-of-the-art letter string recognizer, on a spelled-names task over the telephone, is shown in Table 2 which shows the performance of name recognition using a spelled name grammar.

TABLE 1

| Vocabulary | OOV—type (token) % | | |
|---|---|---|---|
| | Task1 | Task2 | Task3 |
| 100 K | 14.7 (18.6) | 16.1 (36.7) | 17.9 (37.0) |
| 200 K | 9.0 (11.2) | 10.1 (23.7) | 11.6 (25.5) |
| 800 K | 3.5 (4.8) | 3.7 (9.0) | 4.1 (9.3) |
| 1.6 M | 2.3 (2.9) | 2.7 (6.5) | 2.8 (6.5) |

TABLE 2

| Unique Names | name acc (%) | letter acc (%) | rt factor |
|---|---|---|---|
| 124 K | 92 | 98.2 | 0.08 |
| 1.6 M | 83 | 95.2 | 0.27 |

The grammar is constrained to produce only valid names. In experiments, the acoustic model was trained discriminatively on a collection of independent databases of letter string utterances collected over the telephone. All the test names were in-grammar. The accuracy of name recognition, i.e., the letter string accuracy, is fairly good at 92% for a 124,000 vocabulary and degrades to 83% for a vocabulary of 1.6 million names. An accuracy of 83% for name recognition may be considered acceptable in many applications. However, if the name is just one field in a number of fields that need to be filled to complete a task, it may be necessary to operate at much lower error rates to maintain reasonable task completion rates. Another point to note from Table 2 is that the resource requirements (real-time factor on a Pentium desktop with a 1 GHz processor) increases significantly for large grammars.

There are many systems that allow spelling input using just the keypad. For example, schemes that attempt disambiguation by finding a match in a dictionary are suitable for limited vocabularies. As the size of the vocabulary grows, directory lookup often does not result in a unique entry. Table 3 shows the performance of name recognition using keypad input only. Each letter is input using 1 key-press.

TABLE 3

| Names | Keys | Lookup | LM Lookup |
|---|---|---|---|
| 124 K | 99 K | 48% | 93% (98.4% WER) |
| 1.6 M | 1.1 M | 4% | 91% (97.8% WER) |

Table 3 shows the results of an experiment where a single key-press is used to enter a letter. A directory containing 124,000 names maps to about 99,000 unique key sequences. A given key sequence, corresponding to the spelling of a name, results in a unique name after lookup about 48% of the time. The test set of names is the same as the one used in the recognition experiment above. When the directory lookup results in multiple names that match the key sequence, some other mechanism is required to select a single name or generate an ordered set. In this experiment, a language model related to the frequency of names according to the U.S. Census is used to pick the name with the highest frequency of occurrence amongst the set of retrieved names. Since this names distribution of this test sample matches reasonably well with Census distribution, the accuracy of name recognition increases to 93%. For a directory of 1.6 million names, a name is uniquely retrieved only 4% of the time without a Census language model and 91% when the language model is invoked. The risk, however, is relatively high (accuracy could drop from 91% to 4%) when the language model does not match the test data.

The above discussion gives some characterization of the spelled name entry problem. It is clear that solution based on speech or keypad alone may not be acceptable for applications that require highly accurate name entry, given the current state of speech recognition.

The results of name recognition using keypad input to constrain the recognizer are shown in Table 4. Table 4 shows the performance of name recognition using combined keypad and speck input. K-∞ implies that the letter string for the complete name is entered using the keypad. K-N implies that only the first N letters are entered using the keypad. 4g-uns means an unsmoothed 4-gram model of the letter sequences. Real-time factor (RTF) for K-∞ condition is 0.01. As constraints are relaxed, the recognizer becomes less efficient, and RTF increases to 0.07 for the K-1 condition.

The first option is to key in every letter in the name (K-∞) and speak the letters. Even with no lookup, the name can be retrieved with an accuracy of 90% and a letter accuracy of 98.4%. At this point, there are no task constraints built into the system. This accuracy can be improved further by using a task-dependent N-gram model, which in this case was trained on the 1.6 million list of names. It is quite interesting that 98% accuracy can be achieved with a vocabulary of about 1.6 million names. When a directory is used for lookup, name recognition is nearly perfect even for 1.6 million name directory.

If only the first three letters are entered using the keypad, again one key-press per letter, the accuracy of name recognition with no lookup drops to 66% with no language model and 84% with a 4-gram letter sequence model. Directory lookup improves the accuracy significantly to near perfect recognition. Even the entry of the first letter of the name yields accuracies that are much higher than a fully constrained ASR system (improvement from 84% to 94%) for the 1.6M names directory.

As explained below, one could reverse the order of the keypad and speech input. The results are shown in Table 5. Table 5 shows the performance of name recognition using speech input first, followed by keypad entry. The real-time factor for this scheme is in the range 0.1-0.4 because the first-pass recognition is not constrained by keypad input. An unsmoothed 4-gram model is used in the first pass. The name accuracy is a modest 71%. This improves to 91% with a directory lookup for a directory size of 1.6 million. Keypad constraints applied in a second pass significantly improve performance. For the (K-∞) case, the accuracy improves to 97%, roughly matching the accuracy of the system where speech input follows keypad input. The other numbers in Table 5 show that the order of speech and keypad input does not really matter and that the performance in either case is very good.

TABLE 4

| | Accuracy—name (letter) % | | |
|---|---|---|---|
| System | no lookup | 124 K lookup | 1.6 M lookup |
| K-∞ | 90 (98.4) | 100 (100) | 100 (100) |
| K-∞-4grm-uns | 98 (99.7) | 100 (100) | 99 (99.8) |
| K-3 | 66 (93.3) | 100 (100) | 98 (99.5) |
| K-3-4g-u | 84 (96.6) | 99 (99.8) | 97 (99.4) |
| K-1 | 56 (88.9) | 97 (99.2) | 94 (98.6) |
| K-1-4g-u | 76 (93.4) | 94 (98.2) | 93 (97.8) |

TABLE 5

| | Accuracy—name (letter) % | |
|---|---|---|
| System | no lookup | 1.6 M lookup |
| 4g-u | 71 (92.3) | 91 (97.6) |
| 4g-u K-∞ | 97 (99.5) | 99 (99.8) |
| 4g-u K-3 | 84 (96.8) | 97 (99.4) |
| 4g-u K-1 | 75 (94.2) | 93 (97.8) |

Recognition of spellings is a challenge for ASR systems as well as humans. The strategies that human listeners employ for spelling recognition and error corrections are very interactive and involve prompts for partial strings, disambiguation using familiar words, such as "S as in Sam," etc. which are not easily implemented in current ASR systems or are not very effective with current technology. Keypad input may not be very natural in a spoken language system and the design of a user interface to incorporate keypad and speech may be a challenge. However, these experiments have demonstrated that keypad combined with speech can be extremely effective. A variety of embodiments are presented for combining speech and keypad input and these provide mechanisms for a tradeoff between accuracy and convenience.

An effective method of entering spellings over the telephone is disclosed that augments speech input with keypad input. A variety of different mechanisms for integrating the two modalities were presented and evaluated on a names task. The results show that letter strings can be recognized very accurately even without directory-based retrieval. When a directory is used for retrieval, name recognition is nearly perfect even for large directories.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. For example, the alternate means of input 18 is not limited to a telephone keypad but may be any type of keypad or any non-speech input, such as a stylus on a touch-sensitive screen, a button on a vehicle steering wheel or on a computing device connected to the spoken dialog system via voice over IP. Other configurations of the described embodiments of the invention are part of the scope of this invention. Accordingly, the appended claims and their legal equivalents should only define the invention, rather than any specific examples given.

I claim:

1. A method for recognizing a combination of speech and alternate input, the method comprising:
   receiving a non-speech input from a user;
   dynamically constructing an unweighted grammar permitting all letter sequences that map to the received non-speech input;
   constructing a weighted grammar using the unweighted grammar and a statistical letter model trained on domain data;
   receiving speech from the user associated with the non-speech input, wherein receiving the speech occurs after receiving the non-speech input and after constructing the weighted grammar; and
   recognizing the received speech and non-speech input using the constructed weighted grammar.

2. The method of claim 1, wherein the statistical letter model is an N-gram letter model.

3. The method of claim 2, wherein the N-gram letter model is unsmoothed.

4. The method of claim 1, wherein the non-speech input is keypad input.

5. The method of claim 1, wherein the non-speech input is received via a touch sensitive screen.

6. The method of claim 5, wherein the non-speech input is received via a stylus on a touch-sensitive screen.

7. The method of claim 1, further comprising generating a final letter string based on a database lookup.

8. A method of recognizing input from a user, the method comprising:
   performing spelling recognition via automatic speech recognition (ASR) on received speech from a user, the ASR being performed using a statistical letter model trained on domain data and producing a letter lattice $R_{LN}$;
   if an ASR confidence is below a predetermined level, then:
      receiving non-speech input from the user;
      generating a non-speech constraint grammar K; and
      generating a letter string based on a composition of $R_{LN}$ and K.

9. The method of claim 8, wherein the statistical letter model is an N-gram letter model.

10. The method of claim 8, wherein the statistical letter model is unsmoothed.

11. The method of claim 8, wherein the non-speech input is keypad input.

12. The method of claim 8, wherein $R_{LN}$ and K are finite state transducers.

13. The method of claim 8, wherein generating a letter string further comprises generating a letter string based on a composition of finite state transducers $R_{LN}$, K and a transducer that eliminates silence and other filler words.

14. The method of claim 8, further comprising generating a final letter string based on a database lookup.

15. The method of claim 14, wherein generating the final letter string based on a database lookup further comprises using a finite state network that accepts only valid letter strings.

16. The method of claim 5, wherein the database lookup is a database of valid names.

17. The method of claim 8, wherein the received non-speech input only comprises a portion of a word or name.

18. The method of claim 8, further comprising, if an ASR confidence is below a predetermined level, prompting the user to enter the first three or less letters of the input by using a keypad.

19. A system for recognizing a combination of speech and alternate input, the system comprising:
   means for receiving a non-speech input from a user;
   means for dynamically constructing an unweighted grammar permitting all letter sequences that map to the received non-speech input;
   means for constructing a weighted grammar using the unweighted grammar and a statistical letter model trained on domain data;
   means for receiving speech from the user associated with the non-speech input, wherein receiving the speech occurs after receiving the non-speech input and after constructing the weighted grammar; and
   means for recognizing the received speech and non-speech input using the constructed weighted grammar.

20. A system for recognizing input from a user, the system comprising:

means for performing spelling recognition via automatic speech recognition (ASR) on received speech from a user, the ASR being performed using a statistical letter model trained on domain data and producing a letter lattice $R_{LN}$;

if an ASR confidence is below a predetermined level, then the means for performing spelling recognition further:

receives non-speech input from the user;

generates a non-speech constraint grammar K; and generates a letter string based on a composition of $R_{LN}$ and K.

21. The system of claim 20, wherein the statistical letter model is an N-gram letter model.

22. A computer-readable medium storing instructions for controlling a computing device to recognize a combination of speech and non-speech input, the instructions comprising:

receiving a non-speech input from a user;

dynamically constructing an unweighted grammar permitting all letter sequences that map to the received non-speech input;

constructing a weighted grammar using the unweighted grammar and a statistical letter model trained on domain data;

receiving speech from the user associated with the non-speech input, wherein receiving the speech occurs after receiving the non-speech input and after constructing the weighted grammar; and recognizing the received speech and non-speech input using the constructed weighted grammar.

23. A computer-readable medium storing instructions for controlling a computing device to recognize input from a user, the instructions comprising:

performing spelling recognition via automatic speech recognition (ASR) on received speech from a user, the ASR being performed using a statistical letter model trained on domain data and producing a letter lattice $R_{LN}$;

if an ASR confidence is below a predetermined level, then:

receiving non-speech input from the user;

generating a non-speech constraint grammar K; and generating a letter string based on a composition of $R_{LN}$ and K.

\* \* \* \* \*